May 6, 1969     R. M. RUTLEDGE ET AL     3,442,521

COVER FOR SPLIT BAND ON MOLDED ARTICLE

Filed April 22, 1966

*INVENTORS*
RALPH M. RUTLEDGE
ROBERT L. HENRY
WILLIAM A. WILLIAMS

JEFFERS & YOUNG
ATTORNEYS

United States Patent Office 3,442,521
Patented May 6, 1969

3,442,521
COVER FOR SPLIT BAND ON MOLDED ARTICLE
Ralph Martin Rutledge, Robert L. Henry, and William Albert Williams, Fort Wayne, Ind., assignors to Tri-State Products, Inc., Fort Wayne, Ind., a corporation of Indiana
Filed Apr. 22, 1966, Ser. No. 544,518
Int. Cl. F16j 15/12; F16f 15/04
U.S. Cl. 277—237     3 Claims

ABSTRACT OF THE DISCLOSURE

A cover is placed on the inner side of the split in a reinforcing band on a molded article to prevent flash material from passing through the split during molding.

---

The invention relates to a molded article and process for making such an article. The invention particularly relates to an improved molded article having a split reinforcing band or ring (hereinafter referred to as a band), and an improved process for making such an article.

Articles of the type referred to are made of a pliable, resilient material such as rubber, an elastomer, or comparable material for providing seals, bushings, or mountings. Such seals are needed, for example, in hydraulic or gas lines, and such bushings or mountings are needed, for example, to provide damped support. Because of the forces or vibrations imposed on such articles, an enclosing type reinforcing band is frequently needed. And because the article must be retained in place, the reinforcing band may have a predetermined configuration to provide this retention. If the article must be fitted into a space or area with close tolerance between the article and the space, the reinforcing band may have to be split so that it and the article can be compressed or distorted, and inserted, and then snap or spring back into shape in its space or area.

Accordingly, an object of the invention is to provide an improved molded article having a split reinforcing band and an improved process for making such an article.

Articles of the type described have been made by transfer or compression molding in which the split band is placed in a die or cavity of predetermined shape, and a charge of the pliable or resilient material is forced into or placed in the die or cavity. The band and material are molded into a finished article by the application of pressure or heat, or both pressure and heat. In this process, the pliable or resilient material passes through the split in the band to form an objectionable flash (of excess and undesired material). Before the article can be used, this flash must be removed. Such removal may be difficult, time consuming, and costly.

Accordingly, another object of the invention is to provide an improved seal or mounting article having a split reinforcing band that does not permit a flash of excess material to be formed when it is molded.

Another object of the invention is to provide an improved process for molding an article having a split reinforcing band without forming a flash.

One molded article with a split reinforcing band and a process for making the molded article without the formation of a flash is described and claimed in a co-pending patent application entitled "Molding Apparatus and Process," filed by Charles H. Butts on Apr. 8, 1965, Ser. No. 446,510. As described in that application, a dam or cover is provided in a mold plate or die to cover the split portion of the reinforcing band. The dam so provided prevents the formation of a flash when an article with a reinforcing band is molded. However the dam may be difficult to provide in the mold plate, or the dam may make placement of the split band in the mold plate difficult or time consuming, particularly if the split band has a configuration that must provide retention in the utilization of the article.

Therefore, another object of the invention is to provide an improved seal or mounting having a split reinforcing band that does not require a particular mold construction or dam to prevent the formation of a flash.

Briefly, these and other objects are achieved in accordance with the invention by the provision of a plate-like dam or cover which is mounted or placed on the reinforcing band in the vicinity of the split portion so as to cover the split portion. The dam or cover is relatively small, and may have a configuration such that it can be frictionally mounted on the reinforcing band if desired. Preferably, the dam or cover is mounted on the side of the band that causes the dam or cover to be forced into closer engagement with the reinforcing band by the article material during the molding process. After the article with its reinforcing band and cover are molded, there is no flash because the dam or cover prevents the mold material from passing through the split portion of the band. But, the article can be inserted into spaces with close tolerances because the reinforcing band can be compressed and because the cover is only frictionally mounted on the reinforcing band. In one embodiment, the dam or cover does not extend beyond or outside of the reinforcing band so that the band has its normal exterior configuration. In another embodiment, the dam or cover may have an extension or projection which passes through the split portion of the band. Such an extension or projection may facilitate placement of the dam or cover before molding or may facilitate keying or insertion of the finished article into its space.

The invention may be better understood from the following description given in connection with the accompanying drawing. The scope of the invention is pointed out in the claims. In the drawing:

Figure 1:
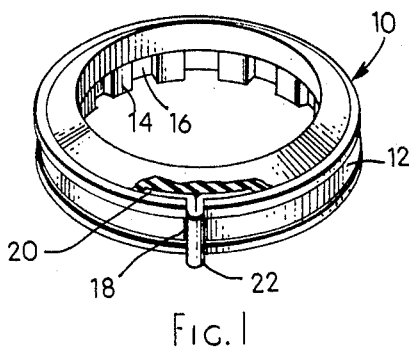
FIGURE 1 shows an isometric view of a preferred embodiment of a molded seal having a split reinforcing band and dam in accordance with the invention.

FIGURE 1 shows a seal 10 which has been chosen, by way of example only, to illustrate one embodiment of the invention. The seal 10 is intended to fit in a circular opening (not shown) and permit a shaft or pipe or other device to pass therethrough without leakage of liquid or other material. It is to be understood that the invention is equally applicable to other articles, such as bushings, or mountings. And, it is to be understood that the invention is applicable to articles of other shapes, as for example hexagons, squares, or some other shape. As mentioned previously, the seal 10 may require a split reinforcing band or ring 12. In the illustration shown, the band 12 has a generally concave shape on its outer surface for fitting into some correspondingly shaped opening. The seal 10 may be provided with a series of projections 14 and indentations 16 to provide better locking or sealing. However, the particular configuration of the seal 10 and the reinforcing band 12 is not essential to the invention. Because the seal 10 may need reinforcing, the band 12 is provided. And because the seal 10 may have to be distorted or misshaped so it can be inserted into an opening with relatively close clearances, the band 12 has a split 18 therein in order that the seal 10, generally formed of a pliable material, and the band 12 may be so distorted or misshaped.

As pointed out above, and as also pointed out in co-pending application mentioned above, the split 18 permits mold material to pass therethrough during the molding process and form an objectionable flash. In some instances, this flash may actually fill up the outer concave surface area of the band 12. Therefore, in accordance with the invention, a plate-like dam or cover 20 is provided to close or cover the split 18. This dam or cover 20 comprises a suitable material generally the same material as the band 12, having a shape or configuration that permits the dam 20 to be placed over the split 18. Since the mold material is assumed to be, and usually is, under pressure on the inside of the band 12 during molding, the dam 20 is placed on the interior face or surface of the band 12. Thus, when the article or seal 10 is molded, the dam 20 is forced against the band 12 and prevents the mold material from passing through the split 18. In the particular embodiment shown in FIGURE 1, the dam or cover 20 is bent from a single piece of metal into an approximate T-shape, with the base of this T-shape serving as a projection 22. This projection 22 actually passes through the split 18, and may facilitate insertion and holding of the dam or cover 20, or may serve as a locating key for the finished seal 10.

Figure 2:
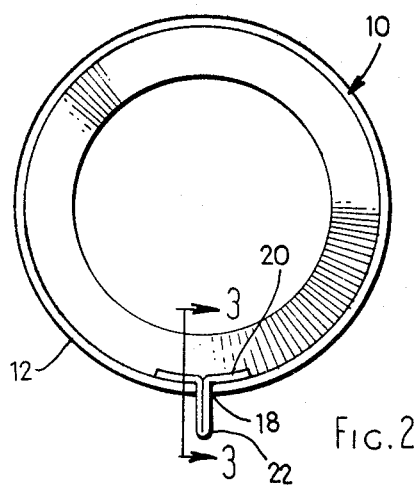
FIGURE 2 shows a plan view of the seal of FIGURE 1.
Figure 3:
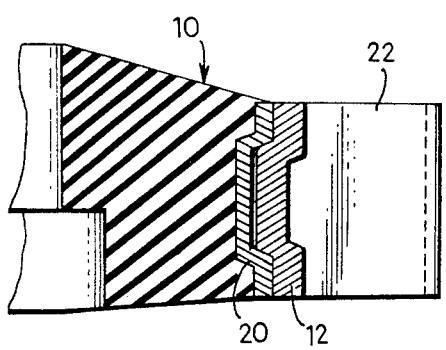
FIGURE 3 shows a cross-sectional view taken along the lines 3—3 in FIGURE 2; and, FIGURE 4 shows an isometric view of another embodiment of a molded seal having a split reinforcing band and dam in accordance with the invention.

FIGURE 2 shows a plan view of the seal 10, and also shows in more detail how the dam or cover 20 covers the split 18 in the band 12. And FIGURE 3 shows a cross-sectional view, taken along the line 3—3 in FIGURE 2. In FIGURE 3, it will be seen how the outwardly facing surface of the dam or cover 20 has a contour or configuration that permits or enables the dam or cover 20 to be frictionally held on the interior surface of the band 12. In addition to providing frictional holding, the similar or corresponding configuration of the dam or cover 20 provides a better arrangement for preventing the mold material from passing through the split 18.

When an article, such as the seal 10, is to be constructed in accordance with the invention, the dam or cover 20 is mounted on the band 12 with the projection 22 passing through the split 18 to the exterior. The band 12 with the cover 20 is placed in a suitable mold, and the finished article is molded either by compression of a change of mold material already in the mold or by transfer of a change of mold material to the mold. Both of these processes are known in the art, and are further explained in the above identified co-pending application. When this molding process takes place, the mold material is forced into the configuration of the mold, but is not able to pass through the split 18 in the band 12 because of the dam or cover 20. After the molding is completed, the finished article can be removed and no further operation on the article is necessary, since the dam or cover 20 prevents formation of any flash.

Figure 4:
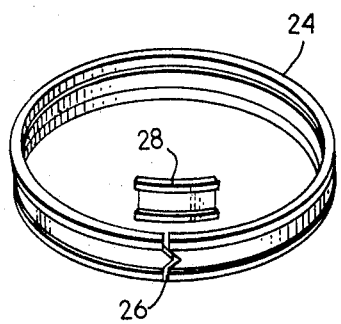

FIGURE 4 shows an isometric view of another band 24, such as might be used in the seal 10 of FIGURE 1. However, the band 24 has a split 26 which is not in a straight line, but which is angled for the purpose of preventing entanglement during processing and manufacturing of the split annular rings. Where the split in the reinforcing band has a configuration such as the split 26 in FIGURE 4, a projection is generally not desirable or feasible. Therefore, a dam or cover 28 shown in FIGURE 4 is preferably used. The dam or cover 28 has a configuration and size which permits the dam or cover 28 to be held against the interior base of the band 24 and cover the split 26 so that mold material cannot pass therethrough during molding, and thus prevent a flash from being formed.

It will thus be seen that the invention provides a new and improved molded material which requires a split reinforcing band. The dam or cover provided by the invention is relatively easy to make and to mount on the reinforcing band. Such a dam or cover prevents the formation of the undesired flash or excess mold material. Persons skilled in the art will appreciate that modifications may be made that still come within the scope of the invention. For example, the dam or cover may be almost any size, although it should cover the split and extend a short distance along the band on each side of the split. The dam or cover may have any shape or configuration as long as it prevents mold material from passing through the split in the reinforcing band. And, the dam or cover may be attached to the reinforcing ring in other ways besides friction. For example, the dam or cover may be fastened on one side of the split by a suitable adhesive, or by stronger means such as welding. Such fastenings still permit the article and band to be inserted. Also, the invention can be used with reinforcing bands or rings of almost any configuration and shape, such as square bands having a flat exterior surface instead of the round band having a concave exterior surface. Therefore, while the invention has been described with reference to particular embodiments, it is to be understood that modifications may be made without departing from the spirit of the invention or from the scope of the claims.

We claim:
1. In a pliable article molded of a material in a predetermined shape and configuration, said article having a split reinforcing band surrounding at least a portion of said article, the improvement comprising a plate-like cover positioned on the interior side of said reinforcing band in the vicinity of the split in said band, said cover having a length and width to encompass the area of said split for preventing said material from passing through said split during the molding of said article.

2. The improvement of claim 1 wherein said cover width is substantially equal to the width of said band adjacent said split, and wherein said cover is frictionally positioned on said band.

3. The combination of claim 1 wherein said article has a generally circular shape and said reinforcing band is circular and surrounds said circular shape, and wherein said cover has a circumferential length greater than the circumferential length of said split and has a width substantially equal to the width of said band.

References Cited
UNITED STATES PATENTS

| | | | |
|---|---|---|---|
| 2,178,077 | 10/1939 | Loftis | 248—26 |
| 2,729,846 | 1/1956 | Reed | 248—26 X |
| 2,803,416 | 8/1957 | Berlien | 248—26 |

SAMUEL ROTHBERG, Primary Examiner.

U.S. Cl. X. R.

248—26